USOO5407152A

United States Patent [19]
Pelischek et al.

[11] Patent Number: 5,407,152
[45] Date of Patent: Apr. 18, 1995

[54] PRE-INTEGRATED TRUSS SPACE STATION AND METHOD OF ASSEMBLY

[75] Inventors: Timothy E. Pelischek, League City; Edgar O. Castro, Houston; Gregg A. Edeen, Friendswood; David A. Hamilton, Houston; Jon B. Kahn; James B. McDede, both of League City; Kornel Nagy; John V. Rivers, both of Houston; Irene E. Verinder, Dickinson; Donald C. Wade, Friendswood; Clarence J. Wesselski, Alvin, all of Tex.

[73] Assignee: The United States of America as represented by the Administrator of National Aeronautics & Space Administration, Washington, D.C.

[21] Appl. No.: 996,763

[22] Filed: Dec. 24, 1992

[51] Int. Cl.⁶ ............................................. B64G 1/10
[52] U.S. Cl. ..................................... 244/159; 244/161
[58] Field of Search ............................... 244/158–159, 244/161

[56] References Cited

U.S. PATENT DOCUMENTS

| 4,308,699 | 1/1982 | Slysh | 244/159 |
|---|---|---|---|
| 4,395,004 | 7/1983 | Gannsle et al. | 244/158 R |
| 4,587,777 | 5/1986 | Vasques et al. | 52/108 |
| 4,807,833 | 2/1989 | Pori | 244/158 R |
| 4,807,834 | 2/1989 | Cohen | 244/159 |
| 4,842,224 | 6/1989 | Cohen | 244/159 |
| 4,872,625 | 10/1989 | Filley | 244/159 |
| 4,978,564 | 12/1990 | Douglas | 428/71 |
| 5,184,789 | 2/1993 | Aldrin | 244/159 |

FOREIGN PATENT DOCUMENTS 2182295 5/1987 United Kingdom ............ 244/158 R

OTHER PUBLICATIONS

Zylius et al, "Assemby in Space of Large Communication Structure", *Industrialization of Space* vol. 36 part 1 1978, pp. 501–518.

Nathan, "A Near Term Space Demonstration Program for Large Structure" *Industrialization Space*, vol. 36, part 1, 1978, pp. 57–70.

"Space Station Engineering and Tech. Development", National Academy Press, 1985.

Esch et al, "Orbital Antenna Farm Power Sys. Challenges" Proceed. of the 14th Intersociety Energy Conversion, Aug. 1979 #799280, pp. 1207–1212.

Boeing Brochure "Space Station Laboratory" Apr. 1986.

O'Leary, *Space Industrialization* vol. II (CRC Press) 1982 pp. 55–61, 80–81.

*Primary Examiner*—Galen L. Barefoot
*Attorney, Agent, or Firm*—James M. Cate; Edward K. Fein; Guy M. Miller

[57] ABSTRACT

The present invention is directed to methods and apparatus relating to design, construction, integration and assembly of a space station. The present invention uses pre-integrated open (unpressurized) truss segments for modular construction of the space station. Each segment includes a truss structure and utility subsystems which may be fully assembled and tested on Earth. The segments may be latched together on orbit using a remote latching system. Utility subsystems, such as solar panels and radiators, are pre-integrated into the appropriate truss segment, and are deployable from the respective truss segment on orbit. Rails run lengthwise along the assembled truss. The rails may be used with a mobile transporter for translating truss segments with respect to the spacecraft as part of the space station assembly process. The rails may also be used with a mobile transporter for carrying crew personnel, a robotic arm, and other equipment.

18 Claims, 4 Drawing Sheets

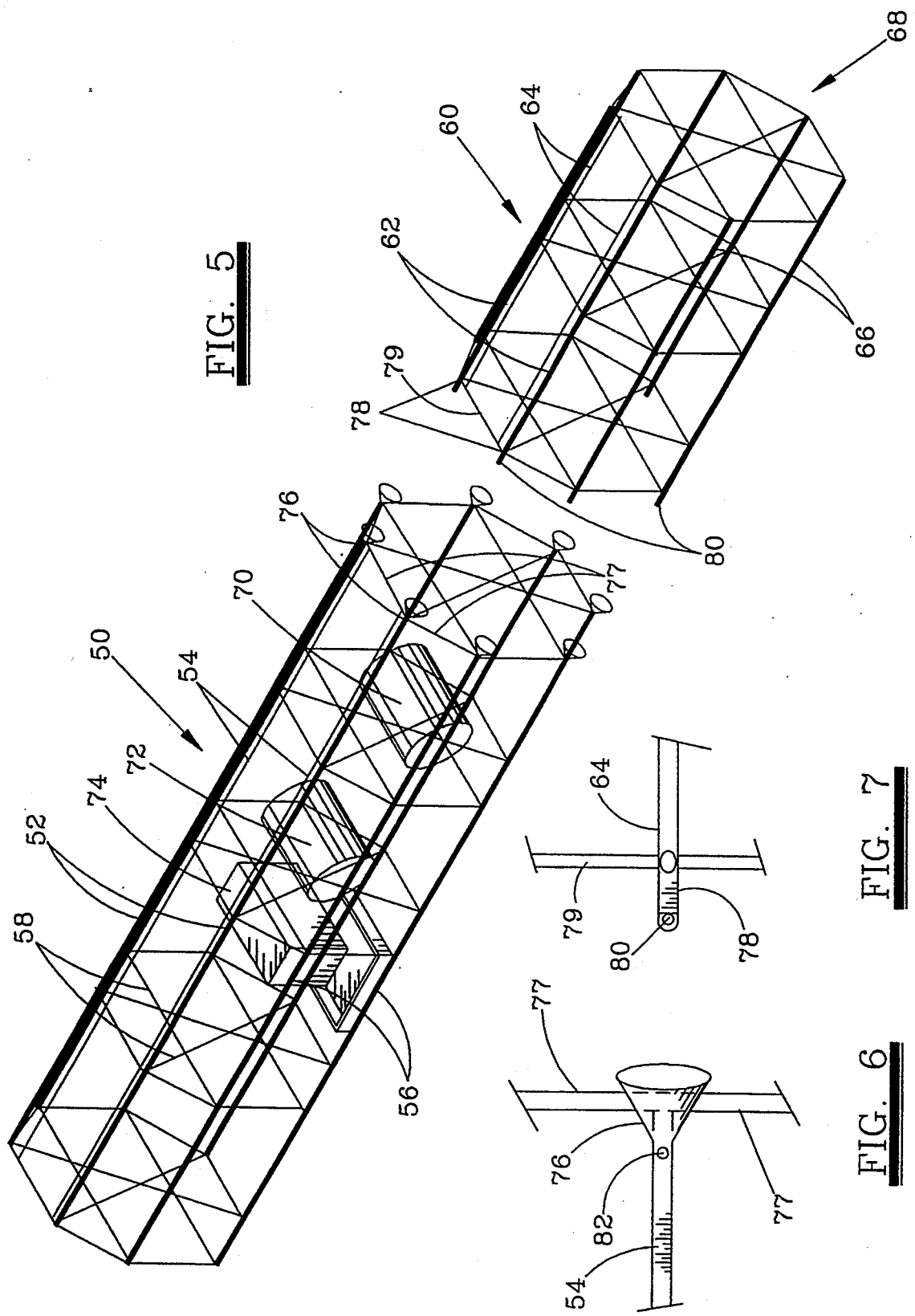

PRE-INTEGRATED TRUSS SPACE STATION AND METHOD OF ASSEMBLY

ORIGIN OF THE INVENTION

The invention described herein was made by employees of the United States Government and may be manufactured and used by or for the Government of the United States of America for governmental purposes without the payment of any royalties thereon or therefor.

TECHNICAL FIELD

The present invention is generally related to on-orbit space station construction. More specifically, the present invention describes methods of truss integration and construction along with methods and structural apparatus used in assembling a space station.

BACKGROUND ART

Prior art methods of truss construction used in large space structures include at least two basic methods: (1) construction of an erectable truss structure with individual components interconnected on orbit, and (2) deployable truss structures which expand from a stowed position to an expanded or deployed position on orbit.

One previously proposed method for assembling an erectable truss structure in space according to the first method listed above utilizes an assembly work platform, a mobile transporter, and an astronaut positioning system. Crew members connect struts, in space, which are 5 meters long and 2 inches in diameter to build the necessary truss structure. After assembling the truss structure, the crew members attach all the space station utilities and subsystems to the truss. After all connections of the subsystems are complete, the integrated subsystems are checked out and verified on-orbit.

According to this proposed method, a mobile transporter translates assembled truss sections out of the work area, which typically would be the payload bay in a shuttle spacecraft such as the space shuttle orbiter. The mobile transporter would also transport robotic arms and other hardware along the face of the truss. The mobile transporter moves with an "inch worm" type motion whereby part of the mobile transporter first moves forward on the truss and secures itself. Then the second half of the mobile transporter releases itself and pulls up to the first half. This truss structure includes a separate rail structure for translation of crew members along the truss structure. The astronaut positioning apparatus would typically include a robotic arm attached to the truss structure which would position an astronaut at various places along the truss structure for construction/repair purposes.

The above described construction method has a number of problems. Due to the large amount of extra vehicular (outside the space shuttle orbiter) activity required, it is difficult, hazardous, and time consuming to build the erectable truss. Since there are so many assembly operations in orbit, there is a high risk that interface problems or other malfunctions would occur. These problems could result in the loss of the space station or loss of a shuttle mission. The operation and construction of the "inch worm" mobile transporter is also complex, and the device would likely be subject to numerous electrical and mechanical problems. The additional rail for translation of crew members must also be assembled onto the truss, and is quite heavy.

Due to the large amount of on-orbit assembly, the above construction method for erecting a truss structure requires a significant amount of flight support equipment. One necessary element of flight support equipment is an assembly work platform, which is relatively complicated and requires on-orbit assembly. The mobile transporter needs to be attached to the assembly work platform to provide capability to translate the truss out of the payload bay as it is assembled.

Also, according to this same proposed method, another necessary flight support element is an astronaut positioning system. This system is comprised of two robotic arms for positioning two astronauts as necessary to assemble the truss and affix hardware to the truss. The astronaut positioning system is complicated, expensive, and heavy.

A utility spool is yet another flight support element of this proposed system. The spool includes utilities such as power, data, video, cooling fluids, waste gas fluids, etc. During the truss assembly, the utility lines are wound off the spool onto the truss. The spool is a large, heavy piece of flight support equipment and is required to erect the truss using this construction method. According to this proposed prior art construction technique, the failure of either the assembly work platform, mobile transporter, spool, or astronaut positioning system could cause loss of a mission success and possibly loss of the space station.

The alternative deployable truss, once launched into space, typically extends linearly from a stowed position to a deployed position while on orbit. Crew members then attach all the space station utilities and subsystems onto the structure after it had been deployed. This design also uses the "inch worm" type mobile transporter.

A problem with the deployable truss is that it cannot be assembled with the sub-systems attached to it for checkout on the ground. This is because the structure is not designed to withstand the one g loading environment which occurs on Earth. The deployable truss is thus not complete upon deployment. Subsystems such as power, data, and plumbing, still have to be added on-orbit after deployment. A rail must be added for crew and equipment translation. An additional risk of the deployable truss is that the deployment may not be complete or may be prevented due to a malfunction of one of the very many deployment mechanisms.

Due to its relatively light construction, the deployable truss is also susceptible to damage from micrometeoroids, orbital debris, and crew induced loading. For this reason, thorough periodic inspections are required on-orbit for this structure. If defects are detected, it is necessary to have the capability to repair or replace damaged components.

U.S. Pat. No. 4,587,777 to Vasques, et al. discloses a deployable space truss. The truss is transported in a collapsed position and extended once in place. It is anchored to an orbiting hub prior to further assembly or the inclusion of utility subsystems. The deployable truss does not have a mobile transporter capable of translating the truss to a position where more truss segments can be added.

U.S. Pat. No. 4,978,564 to Douglas discloses a space station structural element which has embedded electrical lines and which is flexible in nature. It includes a self-deploying structural element having a core of temperature sensitive expanding foam, a load carrying outer component of advanced composite material, and an outer retaining jacket. The heating of the structure causes the foam to cure and expand for deployment. This invention is not a truss with integrated utilities.

U.S. Pat. No. 4,807,834 to M. Cohen discloses an integration channel for subsystems in a space station. The berthing components allow electrical connections to existing modules. The application is directed towards pressurized modules and their interconnections, rather than truss segments pre-integrated to include utility subsystems.

U.S. Pat. No. 4,872,625 to C. Filley discloses a universal module assembly including a pressure vessel having cylindrical side walls and curved end surfaces. A rigid external supporting framework is attached to the exterior of and surrounds the pressure vessel. The main body portion has the general configuration of a right hexagonal prism, and the end portions of the framework are generally frustoconical. The universal modules do not include open truss structures. The universal module is pressurized and does not allow for deployable subsystems such as solar panels and radiators.

Consequently, a need exists for improvements in apparatus and method for constructing a space station to decrease the high costs, as well as the complexity and difficulties of on-orbit assembly. Those skilled in the art have long sought and will appreciate the novel features of the present invention which solve these problems.

STATEMENT OF THE INVENTION

The present invention is directed to a method of truss construction and integration in addition to structural apparatus for assembling a space station. In a preferred embodiment, the apparatus includes an open truss structural segment of a space station with pre-integrated utility subsystems. Each structural segment includes or integrates the subsystems to meet the specific requirements of the particular section of the spaceship, such as avionics, solar arrays, radiators, rotary joints, and control moment gyros. The subsystems may be deployable from the structural segment as necessary, i.e., the solar arrays and radiators. The structural elements are thus designated pre-integrated truss segments. The pre-integrated truss design space station is an assembly of structural segments, each uniquely designed to meet different space station functional requirements.

The entire fully-integrated space station is assembled and functionally tested on Earth. A very few simple utility connections are disconnected to launch to orbit. The structural segments are sequentially attached while on orbit and the simple connections are reconnected. Because the present invention has so few on-orbit connections and assembly procedures, it has a very high reliability of fit and function in space.

One or more sides of the structural segment include rails integrally designed into the longerons. These rails may be used with a mobile transporter or a wheeled cart for transporting astronauts and equipment. Multiple tracks on different sides of the truss may be utilized by the mobile transporter. This may be accomplished by steering the mobile transporter to a position outboard of the solar alpha rotary joint which is normally located at or near the end of the truss. The solar alpha joint can be rotated to align the mobile transporter to another set of tracks. The mobile transporter then translates onto these tracks.

An extendable docking adaptor may be used to support segments above the spacecraft for extra-vehicular activity (EVA) operation. It may also be used to dock the partially completed space station with the spacecraft as it carries to orbit the individual structural segments. Since the extendable docking adaptor connects to the mobile transporter, the partially completed space station can be translated to a position convenient to add the next structural segment from the spacecraft payload bay.

A remote latching or an EVA-assisted system may be used to connect the structural segments together after they are in alignment. A guide system with cone and probe element aids in aligning the structural element together before they are latched in position.

Pressurized habitable modules may be mounted at or near the center of gravity of the space station providing a micro-gravity environment. A micro-gravity environment is necessary during some types of experimentation. In one preferred embodiment, the pressurized habitable module is placed in-line with truss structural segments at a central position. In another embodiment, the truss is canted to shift the mass of the truss and solar panels.

The open truss structural segments may be assembled and tested on Earth. The subsystems are integrated into the structural segments and are also tested to the maximum extent possible while on Earth. The structural segments may be placed in the payload bay of a spacecraft such as a space shuttle orbiter for placement on orbit. The structural segments are designed to withstand the launch loading environment with minimal payload support structure. Due to the launch-driven design, the pre-integrated truss is more robust and is less sensitive to on-orbit loading and associated uncertainties, thereby greatly reducing the need for on-orbit inspection and repair.

The invention utilizes an open truss structure enabling access to and replacement of internally-mounted subsystems. The truss structure incorporates deployable subsystems such as solar panels, radiators and propulsion modules which extend out from the structure.

The first structural segment placed in orbit is attached to the mobile transporter or the docking connector using a robotic arm on the orbiter. After attachment to the docking adaptor, the first structural segment may be translated in the direction of the nose of the orbiter using the mobile transporter. The robotic arm in the payload bay is then used to place the first structural segment and attached extendible docking connector into orbit.

Upon arriving with a second structural segment, the shuttle docks with the first structural segment using the docking adaptor. The second structural segment is lifted out of the payload bay using the robotic arm, and is attached to the first structural segment with remote latching. After attachment, the first and second structural segments are translated in the direction of the nose of the orbiter to prepare for docking and connection of the third and then the fourth structural segment.

In a preferred embodiment, after the fourth segment is added, the pressurized habitable modules will be added. These modules will include a pressurized docking connector. Thus, after the pressurized habitable modules are added to the space station, the extendible docking adaptor on the structural segments is removed so that the mobile transporter is free for other uses. For instance, a robotic arm may be a attached thereto for use in assembling subsequent truss segments of the space station and for maintenance operations.

Each stage of build up of the modular space station is in itself an independent spacecraft. It is able to control it's orientation, and sustain itself until subsequent elements are added to make it a full-functioning spacecraft.

An objective of the present invention is to form a structural support for the space station that is amenable to being integrated with subsystems and verified on the ground.

Another objective of the present invention is to provide a structure with a pre-integrated subsystems arranged in truss segments which can be launched and assembled in orbit with minimum flight support equipment, payload support equipment and extravehicular activity.

A feature of the present invention is the relatively reliable and less complex systems that allow translation of astronauts, large robotic arms, and equipment for any necessary extravehicular activity.

Another feature of the present invention is a pressurized habitable module at or near the center of gravity to allow an optimum micro-gravity environment for experimental and scientific purposes.

The present invention has numerous significant advantages over prior structures and methods related to assembling a space station. The present invention arrives on orbit in large fully assembled or pre-integrated segments so much less time (extra-vehicular and intra-vehicular) is required for construction on orbit. Since the elements of the present invention are pre-assembled and pre-tested on Earth, the system functionality is verified pre-fight and thus the possibility of critical failures or undesirable delays and repairs are dramatically decreased compared to other methods and apparatus.

A further advantage of the present invention is elimination of the need for an extensive payload support structure because the fully assembled robust truss structure serves as its own payload support structure during launch while in the shuttle payload bay.

Because the pre-integrated truss is designed for the severe launch loading environment it is a very robust structural design. Due to its robust design the structure is not susceptible to on-orbit damage from orbital debris and micrometeoroids. Therefore frequent on-orbit inspections are not necessary as with other designs.

BRIEF DESCRIPTION OF THE DRAWINGS

Other features and intended advantages of the present invention will be readily apparent by the references to the following detailed description in connection with the accompanying drawings, wherein:

FIG. 5 is a perspective representation of a pre-integrated truss structure in accord with the present invention;

FIG. 6 is an enlarged elevational representation of a cone guide element in accord with the present invention;

FIG. 7 is an enlarged elevational representation of a probe guide element in accord with the present invention;

While the invention will be described in connection with the presently preferred embodiments, it will be understood that it is not intended to limit the invention to these embodiments. On the contrary, it is intended to cover all alternatives, modifications, and equivalents as may be included in the spirit of the invention.

DETAILED DESCRIPTION OF THE INVENTION

The present invention is directed to a method of truss construction and integration in addition to structural apparatus for assembling a space station. According to this invention, pre-integrated truss structural segments are assembled in space in a modular construction format.

Figure 1:
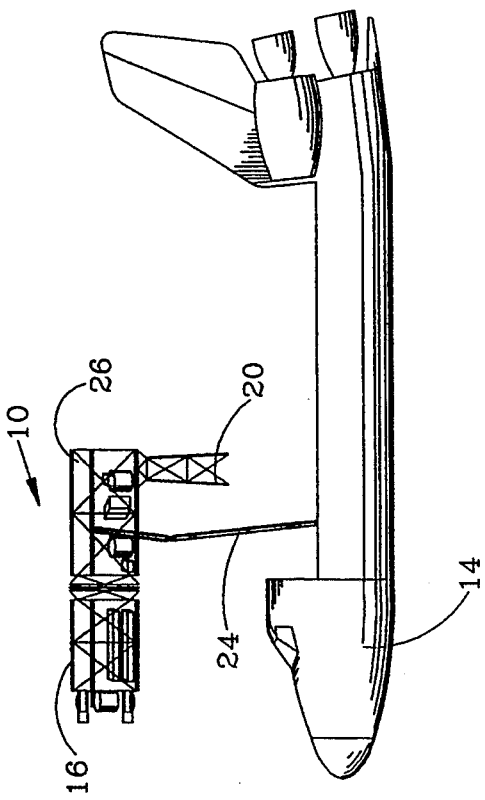
FIG. 1 is an elevational representation of a space shuttle orbiter and a first pre-integrated truss segment in accord with the present invention.
Figure 2:
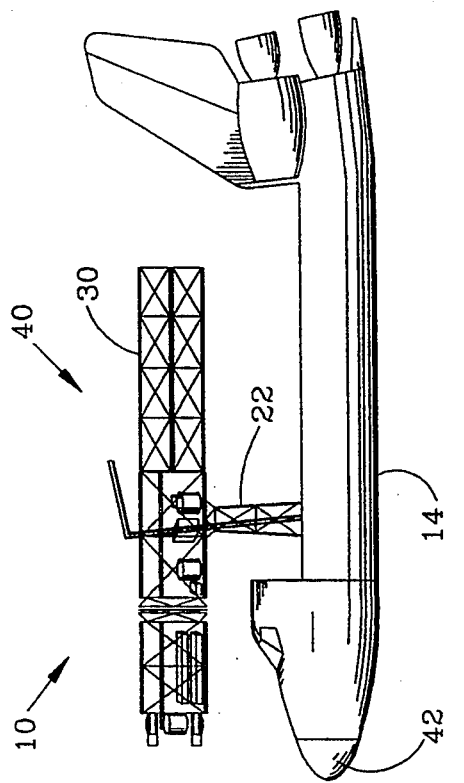
FIG. 2 is an elevational representation of the orbiter and first pre-integrated truss segment of FIG. 1 prior to on orbit release.

FIG. 1 shows pre-integrated open truss segment 10, in accord with the present invention, being removed from payload bay 12 of space shuttle orbiter 14 or other suitable spacecraft. By pre-integrated, it is meant that truss segment 10 is at least substantially fully assembled and preferably includes most, if not all, necessary utility subsystems, as will be discussed in more detail hereinafter. The configuration of open truss structure is also described in detail hereinafter.

The first launch package will typically include solar array module 16 and corresponding solar alpha rotary joint 18 to orient solar array module 16 towards the sun. Extendible docking adaptor 20 is shown in its extended position as released from payload bay 12. Docking adaptor 20 is used to produce sufficient clearance between spacecraft 14 and the space station when docking during assembly of the space station. Adaptor 20 is thus packaged in payload bay 12 during launch in a compressed position, and is extended on orbit. Mobile transporter 22 is attached to extendible docking adaptor 20. At a later time, as will be discussed hereinafter, the extendible docking adaptor may be removed from mobile transporter 22 to be replaced by other equipment, for instance, a robotic arm.

Pre-integrated truss segment 10 is removed from payload bay 12 using robotic arm 24. Truss segment 10 is connected to docking adaptor 20 and more specifically to mobile transporter 22. Depending on its orientation in payload bay 12, pre-integrated truss segment 10 may be rotated end-to-end by robotic arm 24 before connection to docking adaptor 20. Once pre-integrated truss segment 10 is connected to extendible adaptor 20, pre-integrated truss segment 10 is translated to the opposite side 26 from solar array module 16. This translation maneuver creates room for subsequent docking with pre-integrated truss segment 10, as well as clearance for attachment of a subsequent pre-integrated truss segment. After translation, robotic arm 24 is used to remove docking adaptor 20 from payload bay 12 prior to releasing on orbit the entire package, which includes docking adaptor 20 and pre-integrated truss segment 10.

Each stage of buildup of a modular space station is itself an independent spacecraft. Each stage, including pre-integrated structural segment 10, is able to control its orientation, and sustain itself until subsequent segments are added to complete the fully functioning space station.

Figure 3:
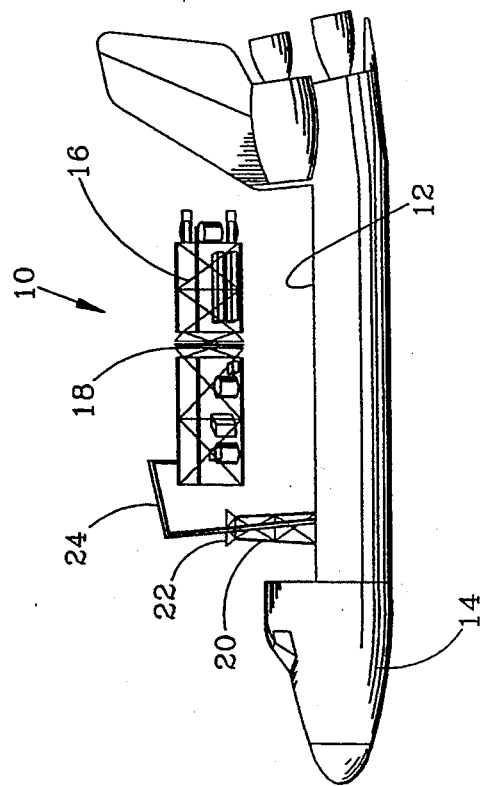
FIG. 3 is an elevational representation of the orbiter prior to docking with the docking adaptor.
Figure 4:
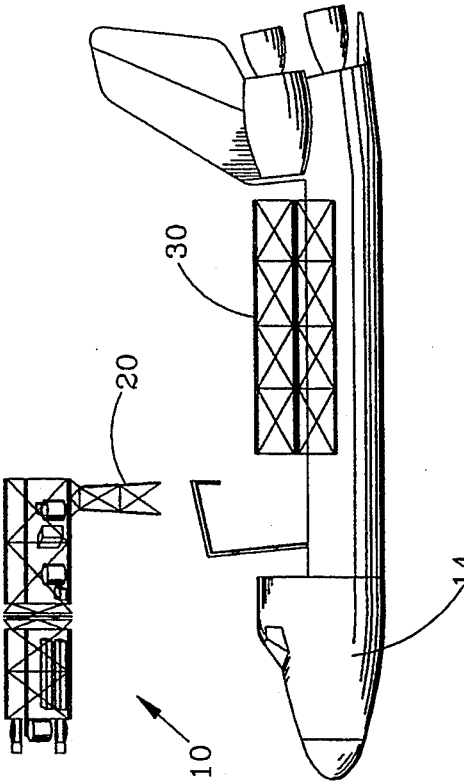
FIG. 4 is an elevational representation of first and second pre-integrated truss segments attached together prior to translation over the nose of the orbiter.

The subsequent launch package includes pre-integrated truss segment 30 shown in FIG. 3. Shuttle 14 docks with docking adaptor 20 prior to assembly of the pre-integrated truss segment 10 together with the pre-integrated truss segment 30. Once pre-integrated truss segments 10 and 30 are connected together as shown in FIG. 4, the partially completed space station 40, then comprised of only two segments, can be translated over nose 42 of orbiter 14 using mobile transporter 22. In this manner, partially completed space station 40 is prepared for addition of a subsequent segment. The process continues until the essential space station truss is completed.

Pre-integrated truss segments 50 and 60, in accord with the present invention, are shown in FIG. 5. A truss structure is meant to be an assemblage of members (as beams) forming a stable and rigid framework. Truss segments 50 and 60 are "open" truss segments, which means that it is not necessary that space internal to the truss be pressurized. Due to the open, or unpressurized, truss structure, components internal to the truss structure are readily accessible as required. This open truss structure also allows for deployable subsystems such as solar array module 16.

Longerons 52 and 62 run fore and aft in their respective pre-integrated truss segments 50 and 60. Present truss design calls for a octagonal cross sectional configuration, as may be seen clearly on end 68 of pre-integrated truss segment 60. Cross bar beams, such as beams 58, add additional strength to the truss structure. While the present truss structure has an eight-sided configuration, other configurations could also be used, including rectangular, hexagonal and even triangular configurations. However, the present configuration is presently considered optimal for, among other reasons, space considerations in terms of payload area in payload bay 12 of spacecraft 14. The sturdy truss structure segments essentially form their own payload support structure in payload bay 12, eliminating the need for extensive payload support equipment as is necessary in previous designs. Since the structure is designed for launch loads, it is very robust for orbital operations. Thus, micrometeoroid and orbital debris damage to the truss structure is not a significant problem as it is for previous designs that are assembled on orbit and designed for on orbit loads only.

Built onto or integral to longerons 52 and 62 are rails 54 and 64. Rails 54 and 64 serve several purposes: (1) They add strength to truss structure; (2) they may be used by mobile transporter 22 for transporting docking adaptor 20 or other structures such as a robotic arm to different areas of the truss; and (3) they may also be used with a wheeled cart for transporting astronauts. The multiple purposes for which rails 54 and 64 may be used adds significantly to the efficiency of the present invention.

If desired, more than one set of rails 54 and 64 may be used on each respective pre-integrated truss segment 50 and 60, so that they are located on multiple sides, e.g., such as along or integral to longerons 56 or 66. Mobile transporter 22 may switch rails using, for instance, solar alpha rotary connector 18 shown in FIG. 1. Mobile transporter 22 may be translated past the rotary connector to solar array module 16. Solar alpha rotary connector 18 may then rotate solar array module 16 with respect to the rest of the truss structure so that another set of rails are aligned to those on which mobile transporter is carried. At that time, mobile transporter 22 may translate onto the new set of rails.

Subsystem 70 is an integrated subsystem within pre-integrated truss segment 50. Subsystem 70 may include various utilities, such as avionics, data transmission, power, cooling fluids, communications, orientation, plumbing, life support, and waste gas/fluids. It is not intended that this list be comprehensive or that all of these utilities will necessarily be employed. Rather, this list is for example only and is not intended to limit the present invention in any way. Subsystem 74 includes a radially outwardly sliding tray for easier accessibility. Subsystems 74 and 70 are referred to as an orbital replacement unit, and may be replaced on orbit as necessary. Subsystems 70 and 72 may each be deployable from pre-integrated truss segment 50.

All subsystems, which may include a substantial number and be of considerable complexity, are preferably installed on Earth. After installation on Earth, they are then checked to the maximum degree possible while on Earth. The avoidance of having to construct and test numerous subsystems in space makes the method and apparatus of the present invention more reliable and less complex than previous designs. Each pre-integrated truss segment is uniquely designed to meet different space station functional requirements.

Pre-integrated truss segments 50 and 60 may be accurately aligned with respect to each other using a guide system prior to their being latched together. In a presently preferred embodiment, the guide system utilizes cones 76 and probes 78, shown in FIGS. 5-7. Initial alignment of cones 76 and probes 78 is made by using robotic arm 24 in payload bay 12 of spacecraft 14. After initial alignment, the guidance system is used to make a final, more precise alignment of pre-integrated truss segments 50 and 60. While such a guidance system could take many forms, the presently preferred embodiment utilizes cones 76 and probes 78 typically positioned on multiple sides of truss segments 50 and 60 as shown in FIG. 5.

Referring to FIG. 6 and 7, cone 76 guides probe 78 towards a latching position. Remotely controlled latches, such as sliding bolt 80 which extends through aperture 82, may be used to latch pre-integrated truss segments 50 and 60 together. Those skilled in the art will realize that various latching mechanisms could be used after alignment is completed so the presently disclosed latches using sliding bolt 80 are provided for illustration purposes and are not intended to limit the invention in any way. Remote latching electronics and circuitry are included in pre-integrated subsystems, such as subsystem 70. Additional remote controls may be included in spacecraft 14, in payload bay 12, or in other areas where control operation is convenient.

Figure 8:
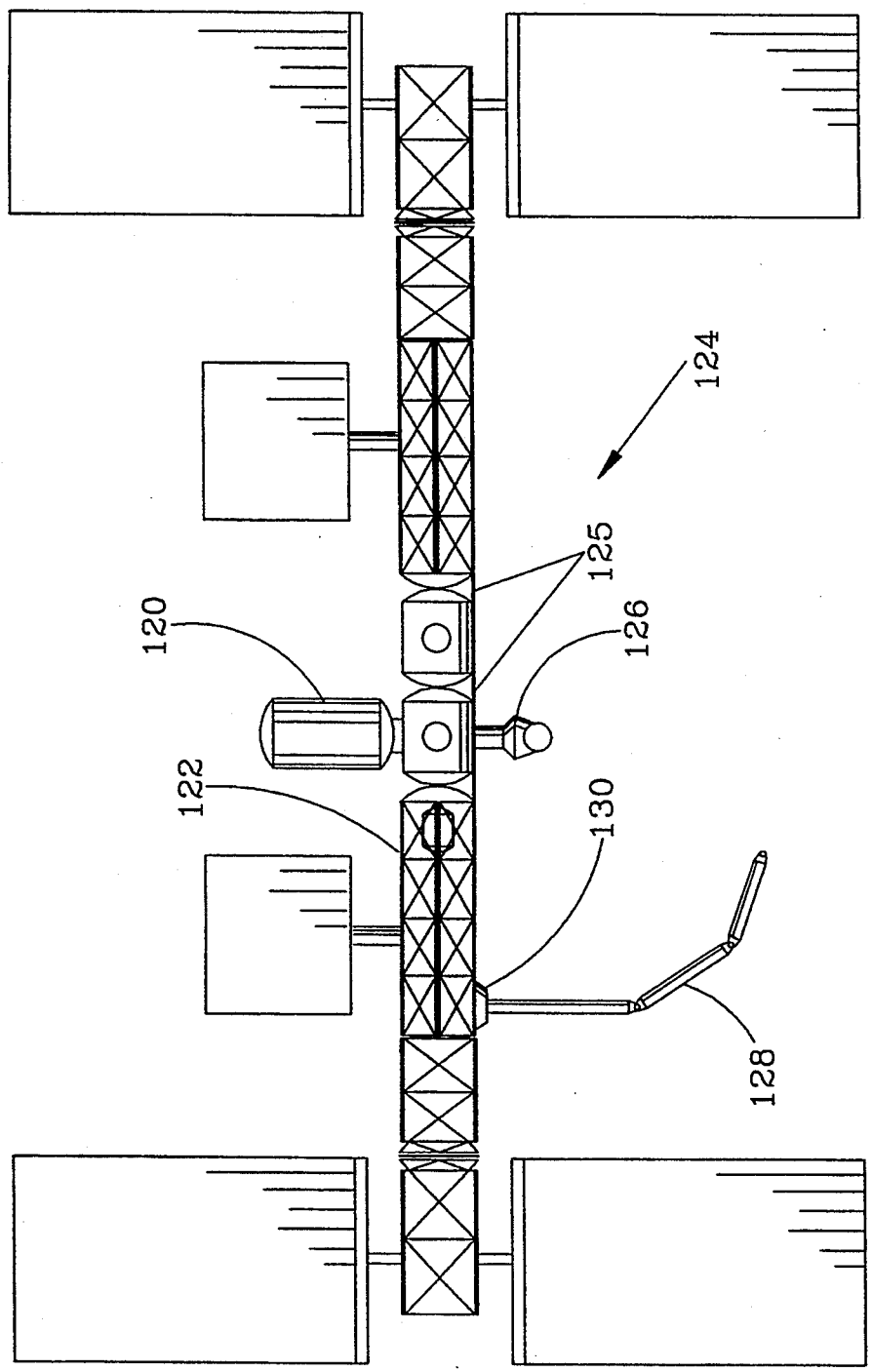
FIG. 8 is an elevation representation showing an in-line mounted pressurized habitable module space station in accord with the present invention.

It is often desirable for experimental and scientific purposes that pressurized habitable module 120, shown in FIG. 8, be positioned around the center of gravity of the space station 124 where the best micro-gravity environment is located. One method of optimizing the micro-gravity environment, as illustrated in FIG. 8, includes the step of placing pressurized habitable module 120 in-line with truss 122. This design also simplifies space station 124 construction in that it does not require pressurized habitable module 120 to be connected laterally to the truss as with the canted truss version of space station 100 discussed subsequently in connection with FIG. 9.

Pressurized habitable module 120 includes pressurized docking adaptor 126 for spacecraft docking and for transfer of crew and equipment from the shuttle 14 to space station 124. Therefore, it is no longer necessary to leave extendible docking adaptor 20 attached to mobile transporter 22 as shown in FIG. 1. Instead, robotic arm 128 can be attached to mobile transporter 130 for translation along truss 122. Rails 125 extend across the face of pressurized habitable module 120 to allow mobile transporter 130 to translate along truss 122 on both sides of pressurized habitable module 120.

Figure 9:
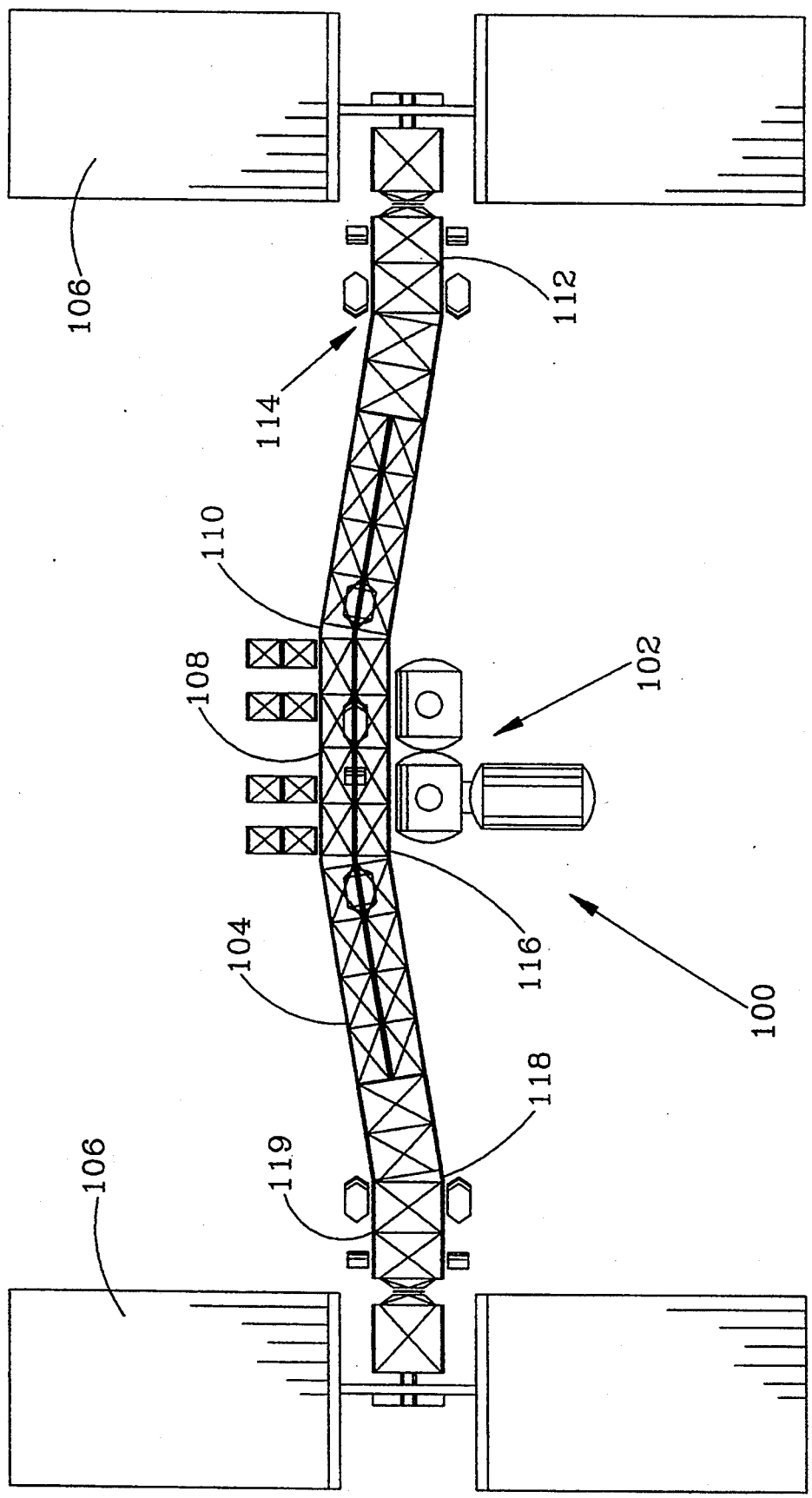
FIG. 9 is an elevational representation of an optional canted truss space station in accord with the present invention.

A canted truss option of space station 100 is shown in FIG. 9. To place the center of gravity of the space station in pressurized habitable module 102, the mass of space station 100 may be moved with respect to pressurized habitable module 102. One way of accomplishing this is to cant or bend truss 104 to shift the mass of truss 104 and solar panels 106. This may be accomplished by mitering connection end 110 of center truss 108 and connection end 114 of solar alpha rotary joint 112. The same mitering procedure is effected at connection end 116 of center truss 108 and connection end 118 of solar alpha rotary joint 119 as shown in FIG. 9. By mitering, it is meant that the engagement face is fashioned or mitered to be at a slight angle rather than orthogonal to the center axis through the truss segment.

In summary, the method and apparatus of the present invention provide a reliable and straightforward means of constructing a space station using pre-integrated and tested modular components.

The foregoing description of the invention has been directed in primary part to a particular, preferred embodiment in accordance with the requirements of the patent statutes and for purposes of illustration. It will be apparent to those skilled in the art, however, that many modifications and changes in the specifically described method and apparatus for constructing a space station may be made without departing from the scope and spirit of the invention. Therefore, the invention is not restricted to the preferred embodiment illustrated but covers all modifications which may fall within the spirit of the invention.

We claim:

1. A method for assembling a space station, comprising the following steps:
   assembling a first unpressurized truss structural segment on Earth;
   integrating utilities and subsystems into said first unpressurized truss structural segment while on Earth;
   functionally testing said integrated utilities and subsystems on Earth;
   placing said first unpressurized truss structural segment into a space shuttle orbiter;
   launching said space shuttle orbiter into low earth orbit;
   extending a docking connector from said space shuttle orbiter;
   removing said first unpressurized truss structural segment from said space shuttle orbiter;
   connecting said first unpressurized truss structural segment with said docking connector;
   translating said first unpressurized truss structural segment with respect to said docking connector; and
   releasing said first unpressurized truss structural segment with the docking connector into low earth orbit in a configuration suitable for subsequent docking with the space shuttle orbiter.

2. The method of claim 1, further comprising:
   assembling a second unpressurized truss structural segment on Earth;
   integrating utilities and subsystems into said second unpressurized truss structural segment while on Earth;
   functionally testing said utilities and subsystems on earth;
   launching said second unpressurized truss structural segment in the cargo bay of a space shuttle orbiter into low earth orbit in the vicinity of the orbiting first unpressurized truss structural segment;
   docking the space shuttle orbiter to the first unpressurized truss structural segment using the docking connector; and
   extracting the second unpressurized truss structural segment from the space shuttle orbiter.

3. The method of claim 2, further comprising the step of:
   interconnecting said first and second unpressurized truss structural segments.

4. The method of claim 3, wherein the step of interconnecting said first and second unpressurized truss structural segments further comprises the steps of:
   aligning said first and second unpressurized truss structural segments with respect to each other; and
   latching said first and second unpressurized truss structural segments together.

5. The method of claim 3, further comprising the step of:
   translating said first and second unpressurized truss structural segments with respect to said docking connector; and
   releasing said interconnected first and second unpressurized truss structural segments with the docking connector into low earth orbit in a configuration suitable for subsequent docking with the space shuttle orbiter.

6. The method of claim 3, further comprising the step of:
   interconnecting a pressurized habitable module within said space station such that a portion of said pressurized habitable module is adjacent the center of mass of said space station.

7. A method of assembling a space station, comprising the steps of:
   assembling separately each of a plurality of unpressurized truss structural segments on Earth:
   integrating utilities and subsystems into each of said plurality of unpressurized truss structural segments while on Earth;
   testing said utilities and, subsystems while on Earth;
   separately launching each of first and second of said unpressurized truss structural segments on a spacecraft wherein said first aid second of said plurality of unpressurized truss structural segments have a combined volume greater than the single launch capability of said spacecraft; and
   interconnecting said plurality of unpressurized truss structural segments with each other and then with a pressurized habitable module such that said pressurized habitable module is adjacent the center of mass of said space station.

8. The method of claim 7, wherein said step of interconnecting said plurality of unpressurized truss structural segments further comprises the step of:

mitering ends of at least two of said plurality of unpressurized truss structural segments at an angle less than 90° to provide canted truss structural portions on each end of the truss for placing said pressurized habitable module adjacent the center of mass of said space station providing a microgravity environment.

9. The method of claim 7, wherein said step of interconnecting said plurality of unpressurized truss structural segments further comprises the step of:

connecting said plurality of unpressurized truss structural segments such that said truss structural segments lie substantially along a common axis; and positioning at least a portion of said pressurized habitable module along said common axis.

10. The method of claim 7, further comprising the step of:

forming rails onto said plurality of unpressurized truss segments and said pressurized habitable module while on Earth; and activating a mobile transporter to move along said rails while on orbit.

11. The method of claim 10, further comprising the step of:

connecting an extendible docking connector to said mobile transporter.

12. The method of claim 11, further comprising the step of:

translating said first and second unpressurized truss structural segments with respect to said docking connector.

13. The method of claim 12, further comprising the step of:

removing said docking connector from said mobile transporter; and connecting a robotic arm to said mobile transporter.

14. A space station in low earth orbit comprising:

a plurality of open truss structural segments with preintegrated utilities and subsystems and deployable subsystems such as solar panels and radiators, the open truss structural segments containing the solar panel subsystems being provided with a solar alpha rotary joint to orient the solar panels toward the sun, each of the open truss structural segments being separately assembled and functionally tested on earth prior to being launched into orbit;

remote latching systems for attaching the open truss structural segments together on orbit to form at least first and second stages of build up of said space station with each of the at least first and second stages of build up including orientation control means to control orientation of the at least first and second stages of build up;

integrally designed mils running lengthwise along longerons of the open truss structural segments;

a mobile transporter adapted for transport along said rails;

an extendible docking connector attached to the open truss structural segments to provide sufficient clearance between the space station and an orbiter during docking with, and assembly of the space station; and pressurized habitable modules mounted at approximately the center of gravity of the space station providing a microgravity environment.

15. A method for establishing a space station in low earth orbit comprising:

assembling on earth each of a plurality of open truss structural segments;

integrating into each of said plurality of open truss structural segments utilities and subsystems;

functionally testing said subsystems on earth;

placing separately each of said open truss structural segments in low earth orbit;

interconnecting said plurality of open truss structural segments with each other in orbit to form at least first and second stages of build up of said space station;

controlling orientation of said at least first and second stages of build up within said low earth orbit; and placing a pressurized habitable module in low earth orbit and connecting said habitable module to the interconnected open truss structural segments so that it will be adjacent the center of mass of the assembled space station so as to provide a microgravity environment therein.

16. The method for establishing a space station specified in claim 15 including sizing at least one of the open truss structural segments to fit within the cargo bay of the space shuttle orbiter to the exclusion of at least one of the remaining open truss structural segments and designing the open truss structural segments to withstand the launch loads.

17. The method for establishing a space station specified in claim 16 in which the first open truss structural segment carried into orbit is provided with an extendible docking connector to dock with the space shuttle orbiter and to provide adequate clearance between open truss structural segments and the orbiter during docking with, and assembly of the space station.

18. The method specified in claim 17 in which a mobile transporter is connected to the extendible docking connector to permit translation of the open truss structural segments with respect to the space shuttle orbiter.

* * * * *